United States Patent [19]
Decarolis et al.

[11] Patent Number: 5,820,057
[45] Date of Patent: Oct. 13, 1998

[54] TAPE RULE WITH GEARED SPRING MOTOR DRIVE

[75] Inventors: Joseph P. Decarolis, Bristol; Mark A. Drechsler, Southington, both of Conn.

[73] Assignee: The Stanley Works, New Britain, Conn.

[21] Appl. No.: 964,670

[22] Filed: Nov. 5, 1997

[51] Int. Cl.⁶ .............................. B65H 75/48; G01B 3/10
[52] U.S. Cl. ...................... 242/375.3; 33/394; 33/761; 33/767; 242/381.6
[58] Field of Search ................................. 242/375.3, 385, 242/385.4; 33/393, 394, 761, 767, 769

[56] References Cited

U.S. PATENT DOCUMENTS

| | | |
|---|---|---|
| 30,612 | 11/1860 | Chappell . |
| 854,931 | 5/1907 | Crotchett . |
| 2,240,753 | 5/1941 | Bouchard et al. . |
| 2,673,694 | 3/1954 | Howell . |
| 2,997,251 | 8/1961 | Chafin . |
| 3,027,977 | 4/1962 | Knaus . |
| 3,862,761 | 1/1975 | Conley . |
| 3,942,738 | 3/1976 | Rutty . |
| 4,189,107 | 2/1980 | Quenut et al. . |
| 4,194,703 | 3/1980 | Roe . |
| 4,205,453 | 6/1980 | Steele . |
| 4,402,472 | 9/1983 | Burtscher . |
| 4,427,163 | 1/1984 | Kondziola . |
| 4,449,302 | 5/1984 | Drechsler et al. . |
| 4,487,379 | 12/1984 | Drechsler et al. . |
| 4,502,226 | 3/1985 | Hung . |
| 4,506,446 | 3/1985 | Mitchell . |
| 4,551,847 | 11/1985 | Caldwell . |
| 4,566,198 | 1/1986 | Yitale . |
| 4,569,490 | 2/1986 | Church . |
| 4,640,472 | 2/1987 | Epple . |
| 4,749,141 | 6/1988 | Young . |
| 4,756,087 | 7/1988 | Sing ......................................... 33/761 |
| 4,773,162 | 9/1988 | Lin . |
| 4,907,348 | 3/1990 | Hubbard, Jr. .............................. 33/767 |
| 5,042,159 | 8/1991 | Millen . |
| 5,104,056 | 4/1992 | Jannotta et al. . |
| 5,119,521 | 6/1992 | Clontz . |
| 5,134,784 | 8/1992 | Atienza ..................................... 33/668 |
| 5,210,956 | 5/1993 | Knispel et al. ............................ 33/761 |
| 5,395,069 | 3/1995 | Chen ................... 242/381.3 |
| 5,440,820 | 8/1995 | Hwang .................................... 333/761 |
| 5,448,837 | 9/1995 | Han-Teng ................................ 33/761 |
| 5,471,761 | 12/1995 | Cheng ...................................... 33/761 |
| 5,531,395 | 7/1996 | Hsu ..................................... 242/381.6 |
| 5,575,077 | 11/1996 | Tae ........................................... 33/767 |
| 5,632,453 | 5/1997 | Hioki et al. .......................... 242/385.1 |

FOREIGN PATENT DOCUMENTS

| | | | |
|---|---|---|---|
| 38 22 37 A1 | 1/1989 | Germany ................................. 33/761 |
| 321819 | 10/1934 | Italy ......................................... 33/394 |
| 195999 | 5/1938 | Switzerland ............................. 33/761 |
| 2 060 899 | 5/1981 | United Kingdom ..................... 22/761 |
| 10612 | 5/1990 | United Kingdom ..................... 33/761 |

*Primary Examiner*—John P. Darling

[57] ABSTRACT

A power recoilable rule includes an elongated housing with a longitudinal dimension which is greater than its height dimension and having a width dimension which is lesser than the height dimension to enable comfortable gripping of the housing by the hand of a user. Mounted in the chamber at its forward end is a blade reel and at its rearward end is a spring motor with a casing and a spring coiled about its hub. Both hubs are mounted on the housing for rotation about transverse parallel axes. Gears on the hubs of the blade reel and spring motor are drivingly engaged with a drive transfer gear and the gear ratio of the blade reel gear to the drive motor gear is at least 2:1. The housing is desirably configured with a reduced height at its rearward end to facilitate gripping.

18 Claims, 3 Drawing Sheets

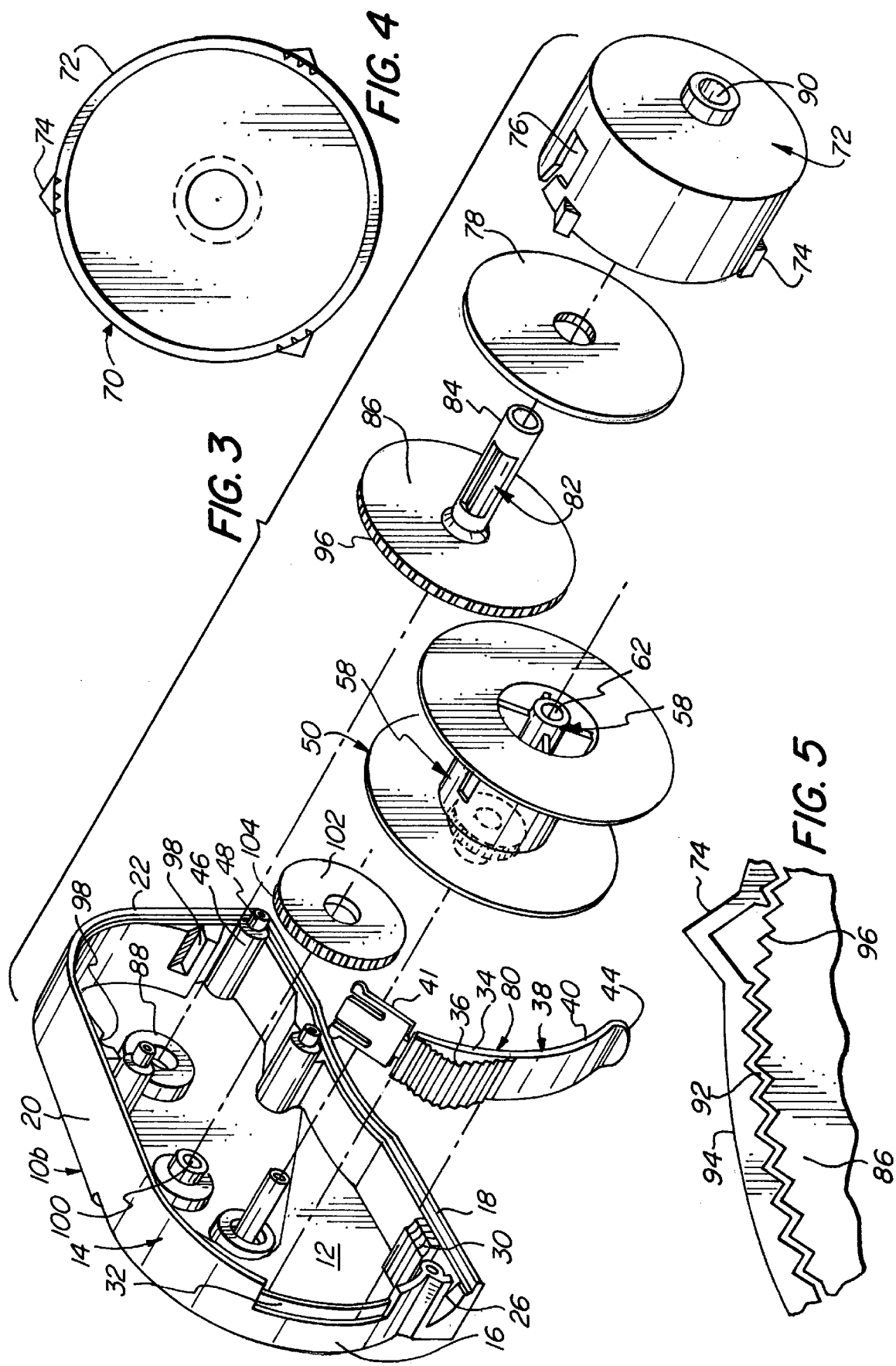

TAPE RULE WITH GEARED SPRING MOTOR DRIVE

BACKGROUND OF THE INVENTION

The present invention relates to power recoilable rules which employ a spring to recoil the measuring blade.

Power returnable coilable rules are widely employed because of the convenience which they afford the user in the automatic rewinding of a measuring blade within the casing. Most such rules employ a single reel in which the spring motor is coiled about the hub and then the measuring blade is coiled thereabout. Although some rules have employed a spring motor separate from the blade coil in order to obtain greater recoiling power, these have generally been bulky and hard to handle.

Various connections between the spring motor and blade reel may be utilized, and gearing generally adds to the dimensional requirements to make the rule more difficult to handle.

Arranging the blade reel and the spring motor side by side will generally require a wide housing which is difficult to grip. Placing the spring motor above the blade coil provides an awkward configuration. Providing the spring coil behind the blade coil provides an elongated structure which can be difficult to handle.

Accordingly, it is an object of the present invention to provide a novel comfortably gripped power recoilable rule utilizing a separate spring motor.

It is also an object of the invention to provide such a rule with components which may be readily assembled to provide a long lived assembly.

Another object is to provide such a rule which may be fabricated relatively economically and which presents a pleasing appearance.

SUMMARY OF THE INVENTION

It has now been found that the foregoing and related objects may be readily attained in a power recoilable rule which includes an elongated housing with front and rear ends and having side walls and a peripheral wall extending therebetween to define a chamber therewithin. The peripheral wall has base, front, rear and top portions, and the front portion has an aperture therein adjacent the base portion. The longitudinal dimension of the housing is greater than its height dimension, and it has a width dimension which is lesser than the height dimension to enable comfortable gripping of the housing by the hand of a user.

A blade reel is disposed in the chamber adjacent the front end and it has a hub mounted on the housing for rotation about a first axis extending transversely of the housing. A spring motor is disposed in the chamber adjacent the rear end and has a hub mounted on the housing for rotation about a second axis extending transversely of the housing and parallel to the axis of the blade reel. The spring motor includes a casing, and a spring in the casing is coiled about and fixed at one end to the hub and at its other end to the casing. A blade coiled about the blade reel has its inner end secured to the hub and its outer end extending outwardly of the aperture in the front portion.

A first gear is operatively engaged with the blade hub to rotate therewith, and a second gear is provided on the spring motor for rotation with its hub. A drive transfer gear drivingly connects the spring motor second gear to the blade reel first gear so as to effect concurrent rotation of the hubs, and it is rotatable about a transversely extending axis intermediate the axes of the blade reel and spring motor. The gear ratio of the drive motor second gear to the blade reel first gear is at least 2:1, and the spring motor is operable to draw inwardly a portion of the blade extending outwardly of the housing, and drawing the blade from the housing tensions the spring motor.

Preferably, the first gear is a pinion gear and the drive transfer gear is a pinion gear meshing therewith. The second gear is a pinion gear extending about the circumference of the spring motor casing and meshing with the drive transfer pinion gear, and it is of larger diameter than the first and drive transfer gears.

Desirably, the rule includes locking means in the housing adjacent the aperture engageable with the blade to prevent its retraction by the spring motor and movable between blade engaging and blade releasing positions. An actuator switch is mounted on the housing for moving the locking means between blade engaging and blade releasing portions.

The pinion gear of the blade reel is on its hub, and the second gear is a pinion gear extending about the circumference of the spring motor casing and meshing with the drive transfer pinion gear. The tape and spring motor reels have their circumferential portions closely spaced, and the transfer gear has its axis spaced above an imaginary line drawn between the axes of rotation of the tape reel and spring motor hubs. All of the gears are disposed in a common longitudinal plane.

Preferably, the spring motor casing has a diameter smaller than that of the blade reel and the housing is reduced in height at the rearward portion thereof. The housing has a recess in the surface of its base intermediate the reel and spring motor casing to facilitate gripping of the rearward portion thereof.

BRIEF DESCRIPTION OF THE DRAWINGS

FIG. 3 is an exploded view of the rule omitting the spring and blade coils and the side cover;

FIG. 4 is an elevational view of the spring motor cartridge;

FIG. 5 is a fragmentary perspective view of the stop elements of the spring motor;

DETAILED DESCRIPTION OF THE ILLUSTRATED EMBODIMENT

Figure 1:
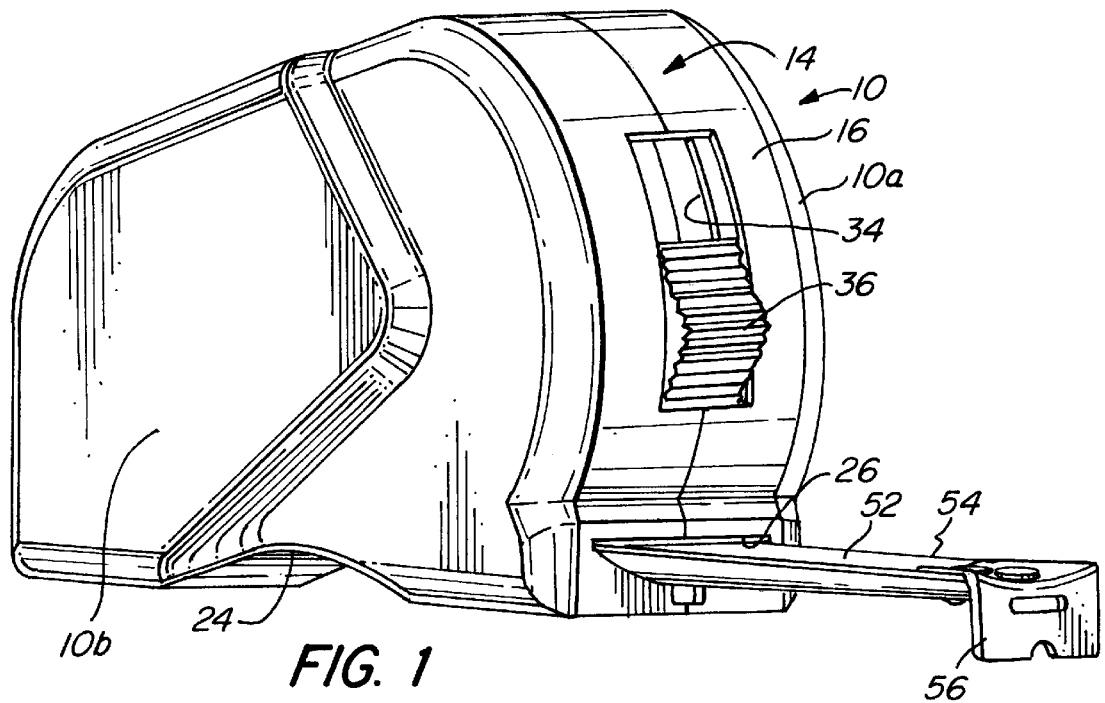
FIG. 1 is a perspective view of the power returnable coilable rule embodying the present invention.
Figure 2:
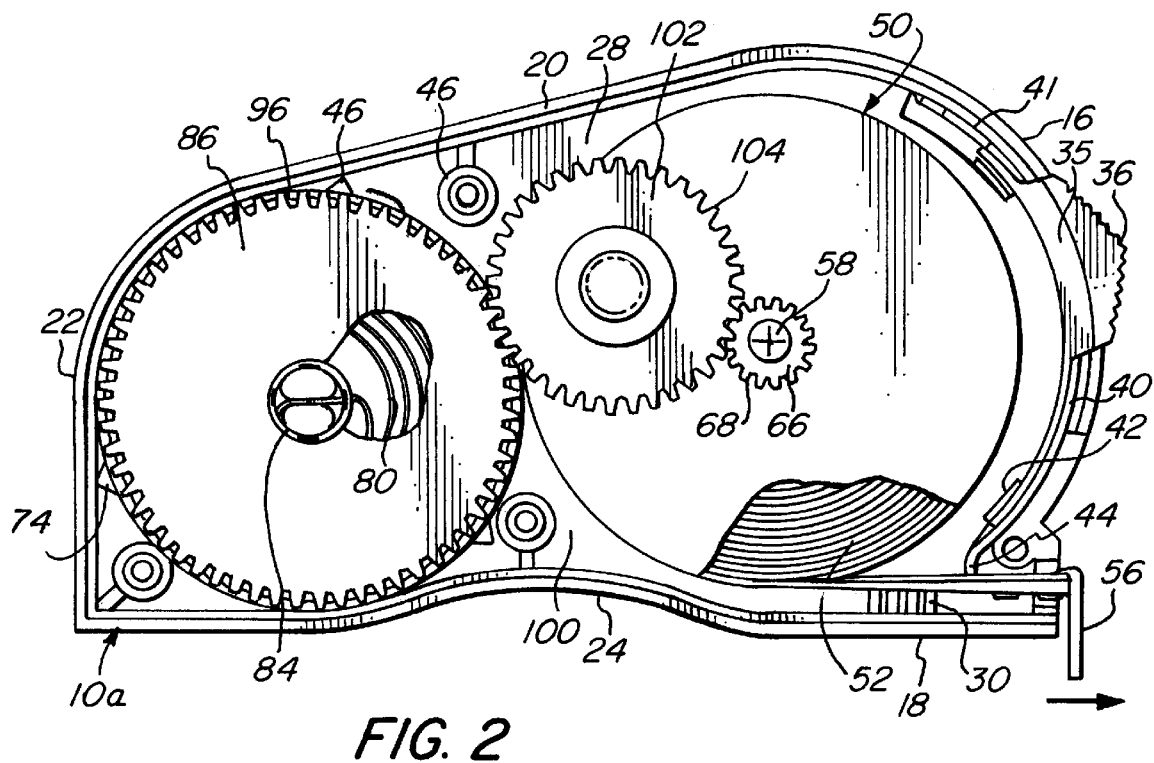
FIG. 2 is a side elevational view of the rule of FIG. 1 with portions broken away to reveal internal construction.

Turning first to FIGS. 1 through 3, therein illustrated is a power returnable coilable rule embodying the present invention and having an elongated housing or casing generally designated by the numeral 10 and comprised of mating sections 10a and 10b. The casing 10 has side walls 12 and a peripheral wall generally designated by the numeral 14 extending therebetween with a convexly arcuate front portion 16, a base portion 18, a top portion 20 and a rear portion 22. The walls 12, 14 provide a chamber 28 therewithin, and the top portion 20 slopes downwardly from the front portion 16 to the rear portion 22 to provide a reduced height at the rearward end of the housing 10. Also, the walls 12, 14 of the housing sections are configured along the base portion 18 to form a concave recess 24 for receiving the forefingers of the gripping hand, thereby allowing the housing to be easily gripped by a user.

As seen in FIGS. 2 and 3, disposed within the chamber 28 of the housing 10 is a reel generally designated by the numeral 50 upon which is coiled the metal measuring blade 52 which has an outer end portion 54 extending outwardly through the aperture 26. A blade hook 56 is provided on the outer end portion 54 of the blade 52 to permit engagement of the end of the blade 52 with a workpiece (not shown), and it also functions as a stop during retraction of the blade 52 into the housing 10.

The reel 50 has a hub 58 in which the inner end of the blade 52 is engaged and about which it is coiled. The reel 50 is rotatably seated upon the cylindrical post 60 which extends through the barrel portion 62 of the hub 58. On the projecting portion of the hub 58 is a pinion gear 66 with teeth 68 extending about its circumference.

Also disposed in the housing chamber 28 adjacent the rearward end of the housing 10 is a spring motor generally designated by the numeral 70. The spring motor 70 includes a cup-shaped housing generally designated by the numeral 72 which has several bosses 74 spaced about its circumference and a cutout 76. A circular plate or washer 78 seats in the open end of the cup over the coiled spring 80 which has its inner end secured in a slot 82 in the hub 84 of the gear 86. The outer end of the spring 80 is secured in the cutout 76. The hub 84 is journalled on the bosses 88 of the housing sections 10a, 10b and extends through the aperture 90 in the casing 72.

As seen in FIG. 5, the inner surface of the casing 72 has spaced tooth-like recesses 92 adjacent the free end of the side wall 94 and the teeth 96 on the gear 86 will mesh therewith to prevent rotation so that the several parts may be shipped as a cartridge and may be rendered operable upon assembly in the housing 10 which moves the gear 86 outwardly of the casing 72. The bosses 74 function as stops to prevent the casing 72 from rotating in the housing 10.

Rotatably seated on the boss 100 is the transfer gear 102 which has its teeth 104 in meshed engagement with the teeth 96 of the large gear 86 of the spring motor 70 and with the teeth 68 of the pinion gear 66 on the tape reel 50. The transfer gear 102 is held in position on the boss 100 by the reel 50 and the large gear 86.

Figure 6:
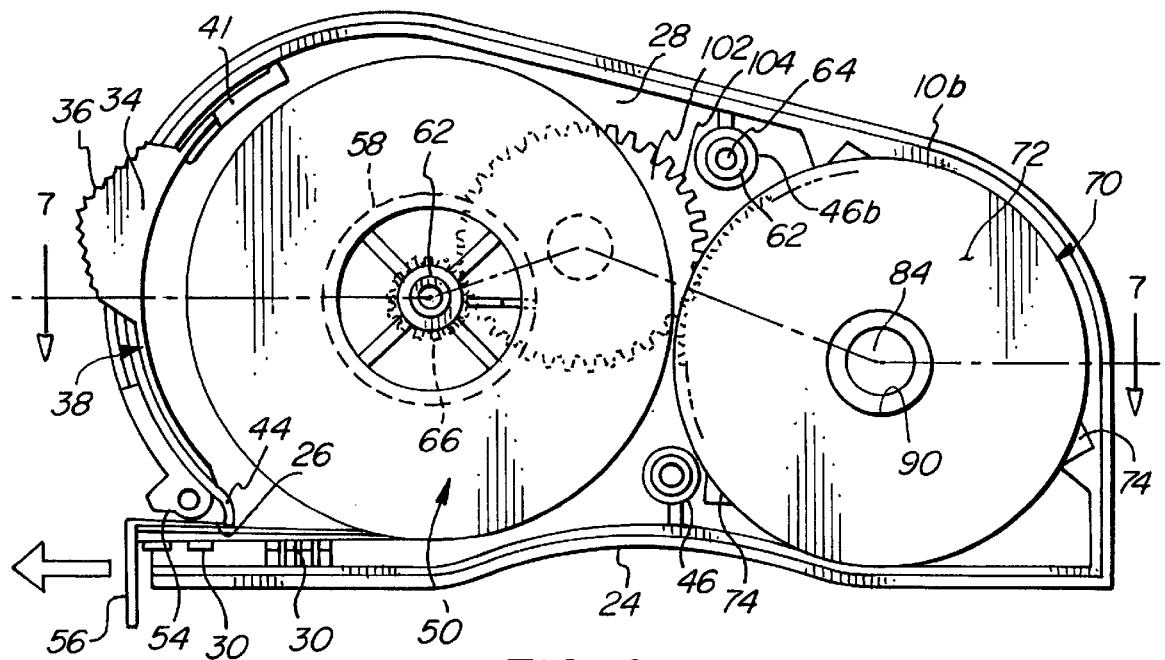
FIG. 6 is an elevational view of the rule on the side opposite that shown in FIG. 2 and with the side wall removed.
Figure 7:
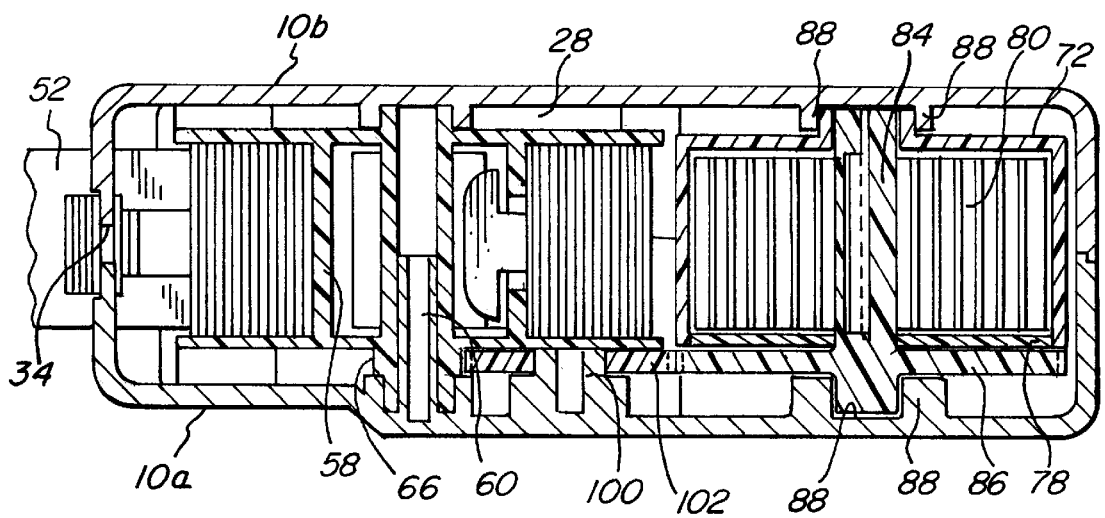
FIG. 7 is a sectional view along the line 7—7 of FIG. 6.

As can be seen in FIGS. 5 and 6, bosses 46 with hollow posts 48 are provided at spaced points about the periphery of the housing section 10b. As seen in FIG. 6, bosses 46a with pins 64 seating in the hollow posts 48 are provided in about the periphery of the housing section 10b so that upon assembly the two components are firmly engaged and held together by threaded fasteners (not shown). In addition, adhesive or sonic bonding may also be employed to secure the elements in assembly. Also molded into the housing 10 are recesses 98 which seat the bosses 74 on the spring motor casing 72 to preclude its rotation within the housing 10.

As best seen in FIG. 2, the front portion 16 of the housing 10 has a transversely extending aperture 26 adjacent the base portion 18 to provide a passage into the chamber 28 within the housing 10. On the interior of the housing adjacent the aperture 26 is an anvil 30 which provides a bearing surface over which the blade 52 extends on its passage to the aperture 26. As best seen in FIG. 1, formed in the front portion 16 of the housing 10 are a lock button recess 32 and a lock button slot 34 which extend in a direction generally perpendicularly to the base portion 18. Seated within the lock button recess 32 is a lock button 36 which is connected by a neck portion 35 in the slot 34 to the elongated lock member generally designated by the numeral 38. This allows the user to manipulate the locking member 38 by the button 36. The lower portion 40 of the locking member 38 slides along the inside surface of the front portion 16 and under the guide rib 42 on the interior of the housing 10. At its lower end lock is a lock portion 44 which will bear upon the blade 52 to press it against the anvil 30 to provide sufficient frictional pressure to hold the blade 52 in an extended position. The upper portion 41 functions as a guide which slides on the inner surface of the front portion 16.

The operation of the rule is best illustrated in FIG. 2 where it can be seen from the arrow that the power spring 80 normally biases the spring motor hub 84 in a counter clockwise direction as shown by the arrow to retract the blade into the case. In use, as the coilable blade 52 is pulled outwardly from the casing, the hub 58 of the reel is rotated in a counter clockwise direction. This counter clockwise rotation of the hub 58 produces counter clockwise rotation of its gear 66 which accordingly produces clockwise rotation of the transfer gear 102. The rotation of the transfer gear in turn produces counter clockwise rotation of the gear 86 on the spring motor 70 and this results in coiling of the spring 80 more tightly about its hub 84, thus producing greater tension in the spring motor 70.

When the blade 52 has been pulled out to the desired length for the particular application, the user moves the lock button 36 downwardly on the front portion 16 of the housing 10. This in turn moves the locking member 38 downwardly in the case and causes the lock portion 44 to press downwardly on the top surface of the blade 52 and force it against the anvil 30. The resultant frictional pressure locks the blade 52 in the extended position. When the measuring function has been completed, the user then moves the lock button 36 upwardly causing the locking member 38 to move upwardly and release the frictional pressure holding the blade 52 in place. The tension in the spring 80 now causes the spring 80 to uncoil in the casing 72 and rotate the hub 84 in a clockwise direction. The gear 86 on the hub 84 is also rotated in a clockwise direction causing the transfer gear 102 to rotate in a counter clockwise direction and, in turn, cause the reel gear 66 to rotate in a clockwise direction and draw the blade 52 inwardly of the housing until the hook 56 abuts the outer surface of the casing 10 adjacent the aperture 26.

As can be seen, the axis of rotation of the transfer gear is disposed above an imaginary line drawn between the axes of rotation for the spring motor hub and for the reel hub and all of the gears lie in a common vertical plane. The relative diameter of the gear surfaces is of significance since it does provide a substantial power benefit in the gear ratios between the gear on the spring motor and the gear on the reel. Generally, the gear ratio is desirably at least 2:1 and preferably on the order of 5:1 in order to minimize the amount of spring power required.

As will also be appreciated, the gear advantage provided by the three gear assembly enables a reduction in the diameter of the spring motor to enable the desired reduction in the rearward portion of the housing to permit it to be easily gripped in the hand of a user. The recess in the base surface of the housing also facilitates comfortable and secure gripping of the rule housing. The circumferential portion of the spring motor is closely spaced to the circumference of the tape reel, and the transfer gear is disposed within the space occupied by the motor and reel, so as to reduce the length required for the housing.

The components of the rule can be readily fabricated from synthetic resin with the exception of the spring and generally the blade. The spring is customarily formed from a suitably tempered steel strip. The blade is also generally formed from a transversely arcuate tempered metal strip although a synthetic resin strip may also be employed for some applications. The hub and gear of the spring motor are conveniently formed as a single piece, and this is also true with respect to the entire tape reel construction. Through precision molding techniques, secondary operations may be eliminated.

Thus, it can be seen from the foregoing detailed specification and attached drawings that the coilable rule of the present invention employs a novel and highly effective assembly for retraction of the extended blade by a compact but powerful spring motor arrangement. The housing is configured and the parts are dimensioned to allow comfortable gripping of the housing by the hand of a user. The components can be readily fabricated and assembled to provide a long lived assembly.

Having thus described the invention, what is claimed is:

1. A power recoilable rule comprising:
    (a) an elongated housing with front and rear ends and having side walls and a peripheral wall extending therebetween to define a chamber therewithin, said peripheral wall having base, front, rear and top portions, said front portion having an aperture therein adjacent said base portion, said housing having a longitudinal dimension which is greater than its height dimension and having a width dimension which is lesser than said height dimension to enable comfortable gripping of the housing by the hand of a user;
    (b) a blade reel in said chamber adjacent said front end and having a hub mounted on said housing for rotation about a first axis extending transversely of said housing;
    (c) a spring motor in said chamber adjacent said rear end and having a hub mounted on said housing for rotation about a second axis extending transversely of said housing and parallel to said axis of said blade reel, said spring motor including a casing and a spring in said casing coiled about and fixed at one end to said hub and at its other end to said casing;
    (d) a blade coiled about said blade reel and having its inner end secured to said hub and its outer end extending outwardly of said aperture;
    (e) a first gear operatively engaged with said blade hub to rotate therewith;
    (f) a second gear on said spring motor for rotation with said hub thereof; and
    (g) a drive transfer gear drivingly connecting said spring motor second gear to said blade reel first gear so as to effect concurrent rotation of said hubs, said drive transfer gear being rotatable about a transversely extending axis intermediate said axes of said blade reel and spring motor, the gear ratio of said spring motor second gear to said blade reel first gear being at least 2:1, said spring motor being operable to coil a portion of said blade extending outwardly of said housing and withdrawal of said blade from said housing tensioning said spring motor.

2. The power recoilable rule in accordance with claim 1 wherein said first gear is a pinion gear and said drive transfer gear is a pinion gear meshing therewith.

3. The power recoilable rule in accordance with claim 2 wherein said second gear is a pinion gear extending about the circumference of said spring motor casing and meshing with said drive transfer pinion gear.

4. The power recoilable rule in accordance with claim 3 wherein said second gear is of larger diameter than said first and drive transfer gears.

5. The power recoilable rule in accordance with claim 1 wherein there is included locking means in said housing adjacent said aperture engageable with said blade to prevent its retraction by said spring motor and movable between blade engaging and blade releasing positions.

6. The power recoilable rule in accordance with claim 5 wherein there is included an actuator switch mounted on said housing for moving said locking means between blade engaging and blade releasing portions.

7. The power recoilable rule in accordance with claim 2 wherein said pinion gear of said blade reel is on said hub thereof.

8. The power recoilable rule in accordance with claim 7 wherein said second gear is a pinion gear on said hub of said spring motor and extending about the circumference of said spring motor casing and meshing with said drive transfer pinion gear.

9. The power recoilable rule in accordance with claim 1 wherein said tape reel and spring motor casing have their circumferential portions closely spaced and wherein said transfer gear has its axis above an imaginary line drawn between the axes of rotation of said tape reel and spring motor hubs.

10. The power recoilable rule in accordance with claim 1 wherein all of said gears are disposed in a common longitudinal plane.

11. The power recoilable rule in accordance with claim 1 wherein said spring motor casing has a diameter smaller than that of said blade reel and said housing is reduced in height at the rearward portion thereof.

12. The power recoilable rule in accordance with claim 11 wherein said housing has a recess in the surface of its base intermediate said reel and casing to facilitate gripping of the rearward portion thereof.

13. A power recoilable rule comprising:
    (a) an elongated housing with front and rear ends and having side walls and a peripheral wall extending therebetween to define a chamber therewithin, said peripheral wall having base, front, rear and top portions, said front portion having an aperture therein adjacent said base portion, said housing having a longitudinal dimension which is greater than its height dimension and having a width dimension which is lesser than said height dimension to enable comfortable gripping of the housing by the hand of a user;
    (b) a blade reel in said chamber adjacent said front end and having a hub mounted on said housing for rotation about a first axis extending transversely of said housing;
    (c) a spring motor in said chamber adjacent said rear end and having a hub mounted on said housing for rotation about a second axis extending transversely of said housing and parallel to said axis of said blade reel, said spring motor including a casing and a spring in said casing coiled about and fixed at one end to said hub and at its other end to said casing;
    (d) a blade coiled about said blade reel and having its inner end secured to said hub and its outer end extending outwardly of said aperture;
    (e) a pinion gear operatively engaged with said blade hub to rotate therewith;
    (f) a pinion gear on said spring motor for rotation with said hub thereof; and (g) a drive transfer pinion gear drivingly connecting said spring motor pinion gear to said blade reel pinion gear so as to effect concurrent rotation of said hubs, said drive transfer gear being rotatable about a transversely extending axis intermediate said axes of said blade reel and spring motor, the gear ratio of said spring motor gear to said blade reel gear being at least 2:1, said spring motor being operable to coil a portion of said blade extending outwardly of said housing and withdrawal of said blade from said housing tensioning said spring motor, said drive motor gear being of larger diameter than said reel gear and drive transfer gear, all of said gears being disposed in a common longitudinal plane.

14. The power recoilable rule in accordance with claim 13 wherein said tape reel and spring motor casing have their circumferential portions closely spaced and wherein said transfer gear has its axis above an imaginary line drawn between the axes of rotation of said tape reel and spring motor hubs.

15. The power recoilable rule in accordance with claim 14 wherein there are included locking means in said housing adjacent said aperture engageable with said blade to prevent its retraction by said spring motor and movable between blade engaging and blade releasing positions, and an actuator switch mounted on said housing for moving said locking means between blade engaging and blade releasing portions.

16. A power recoilable rule comprising:

(a) an elongated housing with front and rear ends and having side walls and a peripheral wall extending therebetween to define a chamber therewithin, said peripheral wall having base, front, rear and top portions, said front portion having an aperture therein adjacent said base portion, said housing having a longitudinal dimension which is greater than its height dimension and having a width dimension which is lesser than said height dimension to enable comfortable gripping of the housing by the hand of a user;

(b) a blade reel in said chamber adjacent said front end and having a hub mounted on said housing for rotation about a first axis extending transversely of said housing;

(c) a spring motor in said chamber adjacent said rear end and having a hub mounted on said housing for rotation about a second axis extending transversely of said housing and parallel to said axis of said blade reel, said spring motor including a casing and a spring in said casing coiled about and fixed at one end to said hub and at its other end to said casing, said spring motor casing having a diameter smaller than that of said blade reel and said housing being reduced in height at the rearward portion thereof, said housing having a recess in the surface of its base intermediate said reel and casing to facilitate gripping of the rearward portion thereof;

(d) a blade coiled about said blade reel and having its inner end secured to said hub and its outer end extending outwardly of said aperture;

(e) a first gear operatively engaged with said blade hub to rotate therewith;

(f) a second gear on said spring motor for rotation with said hub thereof; and (g) a drive transfer gear drivingly connecting said spring motor second gear to said blade reel first gear so as to effect concurrent rotation of said hubs, said drive transfer gear being rotatable about a transversely extending axis intermediate said axes of said blade reel and spring motor, the gear ratio of said spring motor second gear to said blade reel first gear being at least 2:1, said spring motor being operable to coil a portion of said blade extending outwardly of said housing and withdrawal of said blade from said housing tensioning said spring motor.

17. The power recoilable rule in accordance with claim 16 wherein said tape reel and spring motor casing have their circumferential portions closely spaced and wherein said transfer gear has its axis above an imaginary line drawn between the axes of rotation of said tape reel and spring motor hubs.

18. The power recoilable rule in accordance with claim 16 wherein there are included locking means in said housing adjacent said aperture engageable with said blade to prevent its retraction by said spring motor and movable between blade engaging and blade releasing positions, and an actuator switch mounted on said housing for moving said locking means between blade engaging and blade releasing portions.

* * * * *